Dec. 15, 1953  J. L. GIFFEN  2,662,624
ANTIBACKLASH SERVO CLUTCH
Filed July 21, 1948  2 Sheets-Sheet 1
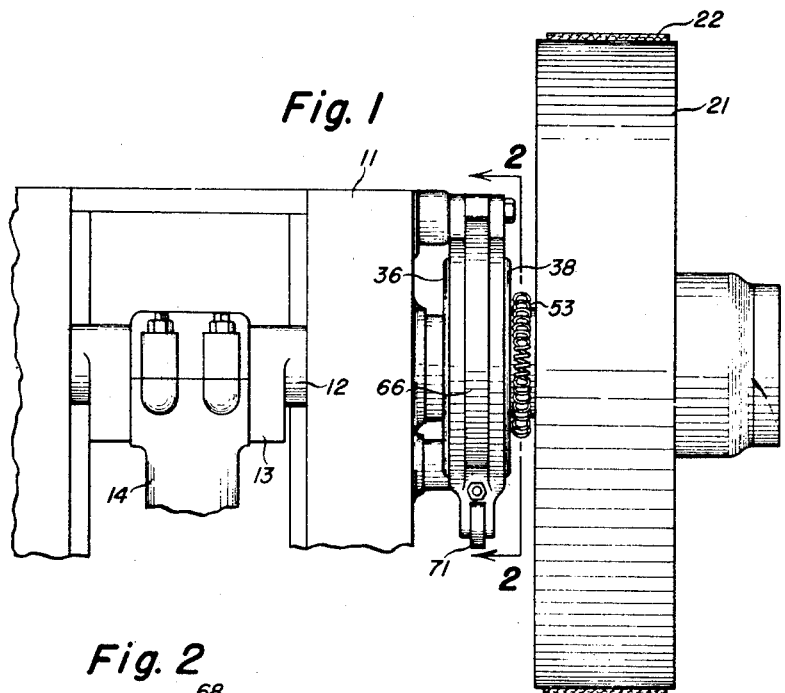
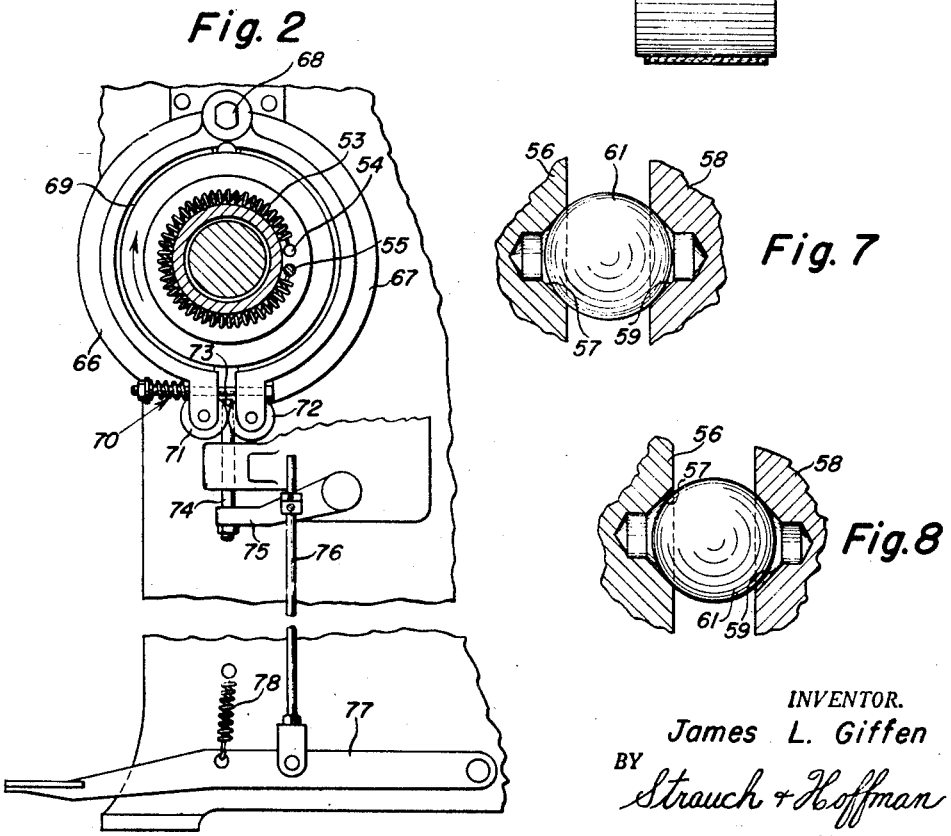
INVENTOR.
James L. Giffen
BY Strauch & Hoffman
Attorneys

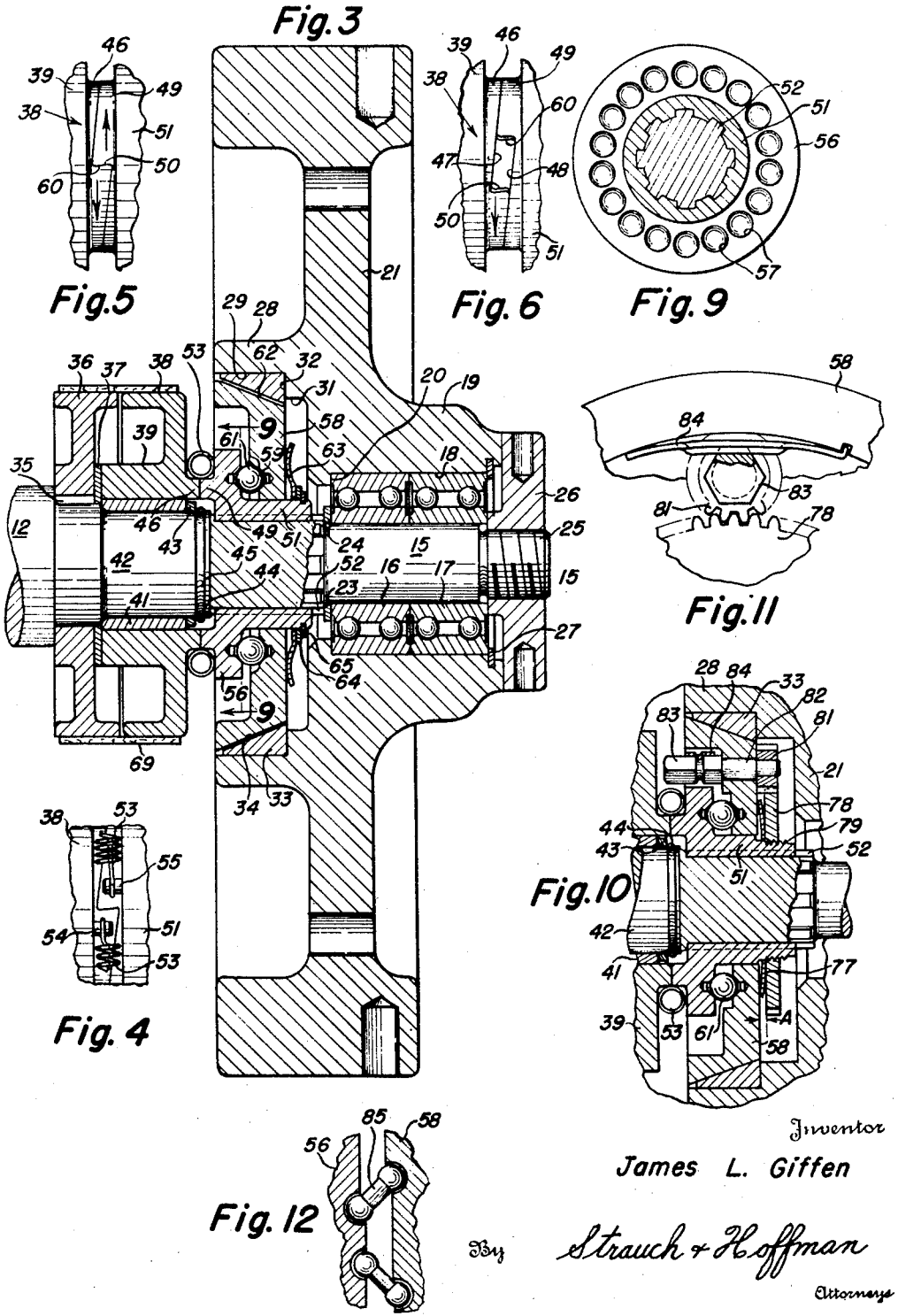
Dec. 15, 1953  J. L. GIFFEN  2,662,624
ANTIBACKLASH SERVO CLUTCH
Filed July 21, 1948  2 Sheets-Sheet 2
Inventor
James L. Giffen
By Strauch & Hoffman
Attorneys Patented Dec. 15, 1953

2,662,624

UNITED STATES PATENT OFFICE 2,662,624

ANTIBACKLASH SERVO CLUTCH

James L. Giffen, Hudson, N. Y., assignor, by mesne assignments, to Emhart Manufacturing Company, a corporation of Delaware Application July 21, 1948, Serial No. 39,921

18 Claims. (Cl. 192—17)

This invention relates to clutches and is particularly concerned with self-energizing clutch mechanisms operated without backlash.

The invention will be described in its preferred embodiment in combination with punch press mechanism for which it is particularly adapted wherein intermittent operation at the will of the operator is desired and wherein energy of a rotating part is utilized to speedily and automatically disconnect a friction clutch drive between that part and the shaft which operates the plunger of the punch press.

The class of clutch controls to which the invention is related and over which the invention represents improvement is that exemplified by Eason Patent No. 2,308,679 granted January 19, 1943. In the clutch control of that patent, the driven clutch member comprises two parts that are connected by struts. The clutch is engaged by relative separation of these two parts under the influence of expanding springs associated with some of the struts. While this arrangement is perfectly satisfactory for effecting clutch engagement, it results in a relation of parts that permits backlash between these clutch parts during the press operation and thus lowers the efficiency of the pressing operation.

The present invention eliminates backlash between the clutch parts while the clutch is engaged, thus providing a smooth and positive pressing operation.

It is therefore the major object of my invention to provide, in a self energizing clutch, mechanism embodying means for eliminating backlash between the clutch parts during operation.

It is a further object of my invention to provide a clutch mechanism wherein the driven clutch member comprises two parts that are separable to engage the clutch and wherein backlash between these parts is eliminated during clutch engagement.

It is a further object of my invention to provide a novel normally disengaged clutch mechanism between a rotatable drive member and a rotatable driven member in a press embodying a brake normally holding the driven clutch member against rotation and maintaining associated clutch parts of the driven clutch member energized whereby upon release of the brake to initiate a desired press operation the clutch parts are automatically operated to engage the clutch mechanism and to disengage the clutch mechanism to terminate the press operation upon re-application of the brake, without backlash in the clutch during the pressing operation.

A further object of the invention is to provide a self energizing clutch mechanism embodying a novel adjustment for determining the load under which the clutch will slip.

Further objects of the invention will presently appear as the description proceeds in connection with the appended claims and annexed drawings wherein:

Figure 1 is a front elevation of part of a punch press including a preferred embodiment of the invention and illustrating the fly wheel, crank shaft and brake mechanisms as mounted on the frame of the press;

Figure 2 is a section, substantially along line 2—2 of Figure 1, illustrating the brake mechanism and the treadle for operating it, as well as the annular spring for operating the driven clutch member parts;

Figure 3 is an enlarged axial section of part of the press of Figure 1 illustrating the clutch operating mechanism and fly-wheel association;

Figure 4 is a fragmentary end elevation looking out of the plane of Figure 3 illustrating the connections between the spring ends and the clutch parts;

Figure 5 is a fragmentary side elevation of the separable cam jaws;

Figure 6 is a fragmentary side elevation similar to Figure 5 but illustrating relative axial separation of the cam jaws which takes place after the brake has been released;

Figure 7 is a fragmentary section in elevation illustrating the ball and socket connection between the relatively rotatable clutch parts during normal operation of the press;

Figure 8 is a fragmentary elevation in section similar to Figure 7, but illustrating the strut action of the balls during self-energization of the clutch;

Figure 9 is an end elevation in section substantially on line 9—9 of Figure 3 illustrating the ball and socket connections between the clutch parts;

Figure 10 is a fragmentary axial section of a further embodiment similar to Figure 3, illustrating an additional adjustment for varying the point at which the clutch will slip under load;

Figure 11 is a fragmentary end elevation illustrating further the adjustment of Figure 10; and Figure 12 is a fragmentary section illustrating a further embodiment wherein struts are used instead of balls.

Referring to Figure 1, a punch press frame 11 provides a rigid heavy support for journalling a horizontally disposed shaft 12 which is formed with an eccentric portion 13 for operating a crank arm 14 for reciprocating the plunger of the press vertically in press operation. Shaft 12, beyond its bearings in frame 11 (Figure 3), is provided with a reduced end portion 15 on which are supported the inner races of ball bearing assemblies 16 and 17. The abutting outer races of bearings 16 and 17 are mounted within the axial bore 18 of the hub 19 of a flywheel 21 which is the driving element for the punch press of Figure 1. The inner end of the outer race of bearing 16 seats against a shoulder 20 in the inner end of bore 18. Fly wheel 21 is driven by a belt 22 suitably secured to a motor or other suitable source of power.

At the inner end of fly wheel hub 19, shaft 12 is provided with a shoulder 23, and a washer 24 is provided between shoulder 23 and the inner race of bearing 16 to limit axial displacement of the fly wheel to the left in Figure 3. The extreme outer end of shaft portion 15 is threaded at 25 and a nut 26 is mounted on threaded shaft portion 25 with its inner surface in running clearance relation with the adjacent end of hub 19. When drawn tight, nut 26 urges the inner races of bearing members 16 and 17 together and against washer 24 to provide an axially rigid assembly on the shaft. A snap ring 27 is mounted in an internal groove formed in the outer end of bore 18 to abut the outer end of the outer race of bearing 17 and hold the bearing assembly against axial displacement.

Inwardly of its hub 19, fly wheel 21 is formed with an integral boss 28 having a cylindrical bore 29 at its inner open end and an inner reduced bore 31 providing an annular space inwardly of bore 29 for a purpose that will appear. A clutch lining member 33 comprising an annular body of friction material is mounted rigidly on the fly wheel, preferably by press fitting it tightly into bore 29 until it abuts against a shoulder 32 at the bottom of the bore, thereby accurately locating and securing the clutch lining within bore 29. Clutch lining 33 presents an outwardly sloping conical surface 34 symmetrical about the axis of rotation of shaft 12. Lining 33 is readily removable for replacement when worn.

Clutch lining 33 may be of any suitable friction material, and the friction and tight fit between it and bore 29 and shoulder 32 will be ample to prevent its rotation relative to flywheel 21 particularly during the heavy engagement pressures encountered in punch press work.

In normal operation, collar 26 may have a running clearance of about .003 inches with fly wheel hub 19, but when the parts are under heavy load, as when the clutch is engaged, the hub may shift to engage collar 26, taking up the clearance and thus limiting the maximum end thrust on the bearings 16 and 17 to a safe value. This construction is of particular value in a heavy duty mechanism such as a punch press.

The clutch lining member 33 is preferably solid and has been found superior to riveted clutch linings heretofore used for the purpose. Any friction material such as formica, hard plastic or the like is contemplated. It is even within the scope of the invention to employ a cast iron ring insert at 33, and if cast iron is used the surface 34 may be formed directly on the inner portion of boss 28 to eliminate the need for a separate lining member.

Shaft 12 has secured thereto, as by a key and keyway arrangement 35 (Figure 3), a brake drum 36 which is non-rotatable and non-slidable with respect to shaft 12. Separated from brake drum 36 by a freely rotatable spacer and thrust bearing annulus 37 is a freely rotatable brake drum 38, the hub 39 of which surrounds a bushing 41 mounted about a reduced portion 42 of shaft 12 inwardly of shaft portion 15. Bushing 41 is engaged at one end with thrust bearing 37 and comprises a radial bearing for the idly mounted brake drum 38. At the other end of bushing 41 is a thrust and retainer collar 43 loosely surrounding shaft portion 42 and held in place by a snap ring 44 mounted in a groove 45 in shaft portion 42.

As illustrated in Figure 6, the inner end of brake hub 39 is provided with a projecting integral cam 46 extending toward the fly wheel, and cam 46 is formed with inclined faces 47 facing in the axial direction toward the fly wheel for coaction with similarly inclined faces 48 on a coacting cam 49 integral with a sleeve 51 non-rotatably mounted on shaft portion 15 as by the spline connection indicated at 52. The cams 46 and 49 are formed with coacting jaws 50 and 60. The spline connection at 52 permits axial displacement of sleeve 51 with respect to shaft 12, for a purpose to appear. The cams 46 and 49 are surrounded by a garter spring 53 which is a coil spring having one end secured to a pin 54 (Figure 4) rigid with idle brake drum 38 and the other end secured to a pin 55 rigid with a radial flange 56 on sleeve 51. The purpose of this spring will be explained later.

On its side facing the fly wheel, and disposed within the recess provided by boss 28 of the fly wheel sleeve, flange 56 is provided with a circumferential series of spaced conical sockets 57 which are arranged at the same distance from the center of rotation of the sleeve, as illustrated best in Figure 9. A clutch member 58, which is freely rotatably mounted on sleeve 51, is provided on its inner side with a similar series of conical sockets 59, and when the parts are assembled as in Figure 3, a series of spherical balls 61 which preferably are hardened steel bearing balls are mounted with their opposite sides within the sockets 57 and 59. In practice, I have operated successfully a clutch of this nature using eighteen one-half inch balls equally spaced along a three-inch diameter center.

The outer peripheral surface 62 of clutch member 58 is conical for coextensive engagement with surface 34 of lining 33 when clutch member 58 is pushed into contact with the lining. Clutch member 58 is preferably of hardened metal to protect ball seats 59 against deformation or crushing.

As illustrated in Figure 3, sleeve 51 is surrounded by a resilient spring disc or annular spring plate 63 which reacts between a spacer ring 64 and the rear face of member 58 to normally urge member 58 to the left in Figure 3 and thereby tend to maintain sleeve 51 and clutch member 58 in solid assembly through the balls 61 at all times. A snap ring 65, seated in a suitable groove on sleeve 51, backs ring 64 against displacement to the right in Figure 3.

Referring now to Figures 1 and 2, opposed brake shoes 66 and 67, mounted on a common pivot 68, are provided with a friction band lining 69 which, as illustrated in Figure 3, is wide enough to encompass both brake drums 36 and 38. At their lower ends, brake shoes 66 and 67 are provided with rollers 71 and 72 and are normally biased together toward brake applied position by means of the spring and stud assembly at 70. A wedge 73 is mounted on the upper end of a vertically reciprocable rod 74 connected to one end of a pivoted lever 75 actuated through rod 76 by a pivoted foot treadle 77. When the operator steps on treadle 77, wedge 73 is moved down between rollers 71 and 72 to separate brake shoes 66 and 67 to release the brake. When the operator releases treadle 77, wedge 73 is moved and held at its uppermost position by a tension spring 78, and thus enables spring and stud assembly 70 to apply brake band 69 about both brake drums 36 and 38 simultaneously.

In operation, with flywheel 21 continuously driven through belt 22, the parts are in such position, prior to depression of treadle 77, that brake band 69 is tight about both brake drums 36 and 38, clutch surfaces 34 and 62 are separated and shaft 12 is held against rotation. Under such condition the spring 53, which is under tension, is acting in the direction of the arrows in Figure 5 to tend to oppositely rotate brake drum 38 and sleeve 51. Since sleeve 51 is held against rotation by shaft 12 and band 69 about brake drum 36, and since brake drum 38 is now also held stationary by the brake band 69, neither sleeve 51 nor drum 38 can rotate and the parts are maintained in the position illustrated in Figures 3 and 5 wherein sleeve 51 is at the leftward limit of its travel on shaft portion 15 with minimum spacing between it and brake drum 38, and with the cam jaws 50 and 60 in closed engagement as illustrated in Figure 5. The spring plate 63, reacting against spacer 64, urges clutch member 58 to the limit of its leftward travel in Figure 3 and maintains clutch member 58, balls 61 and sleeve 51 in tight assembly. This positively maintains the clutch disengaged. Under these conditions, the balls 61 are seated as in Figure 7, and there is no torque being transmitted between clutch member 58 and sleeve 51.

As soon as the operator depresses treadle 77, wedge 73 separates the brake shoes until brake band 69 simultaneously releases both brake drums 36 and 38. As soon as freely rotatable brake drum 38 is released, tensioned spring 53 acts to relatively rotate sleeve 51 and drum 38. Since drum 38 is of little mass and freely journaled, and since the inertia of shaft 12 and the parts connected to it is fairly large, contraction of spring 53 causes drum 38 to rotate quickly about its axis in the direction of the arrow in Figure 6. Due to the thrust reaction of drum hub 39 at 37 and relative sliding of the inclined cam faces 47 and 48, this spring urged rotation of drum 38 causes rightward axial displacement of sleeve 51 along the shaft in Figure 3, the cam jaws thereby being separated as illustrated in Figure 6.

Displacement of sleeve 51 to the right in Figure 6 is transmitted through balls 61 to clutch member 58, to thereby displace clutch member 58 to the right in Figure 3 and force it into engagement with clutch lining 33, thereby engaging the clutch. The pressure of spring plate 63 maintains the sleeve 51, balls 61 and clutch member 58 in tight assembly all this time.

Engagement of the clutch members 58 and 33 provides friction drive of shaft 12 by the continuously rotating flywheel. The drive torque is transmitted from clutch member 58 through balls 61 to sleeve 51 which is splined on shaft 12. Balls 61 thus function as force transmitting struts between clutch member 58 and sleeve 51. Strut action of balls 61 during torque transmission tends to separate sleeve 51 and clutch member 58, but such separation is prevented because sleeve 51 engages cam face 47 and clutch member 58 is engaged with surface 34. This strut action of balls 61 in attempting to separate sleeve 51 and clutch member 58 provides a force reaction, as do the solid driving struts of said Patent 2,308,679, which tends to urge clutch member 58 into higher pressure engagement with clutch lining 33. The relation of the parts is such that this self-energizing action automatically creates maximum pressure between surfaces 34 and 62 at the time when the punch press crank shaft is under maximum torque.

While the clutch is engaged and particularly during the pressing operation, no backlash is permitted between sleeve 51 and clutch member 58 because the assembly comprising sleeve 51, balls 61 and clutch member 58 is effectively trapped between the cam on drum 38, which is backed by bearing annulus 37, drum 36 and the shoulder on shaft 12 to prevent axial movement thereof, and the flywheel 21, which is held against axial movement in the opposite direction relative to shaft 12 by the cooperation of shoulder 20, bearings 16 and 17, and nut 26 after having accomplished engagement of the clutch without separation of the clutch parts 51 and 58. These components in the disclosed and preferred embodiments of my invention are operative while the clutch is engaged to allow only such relative movement between the parts 56 and 58 of the driven clutch member as may result from the self-energizing action of the clutch such as deformation of the metal under extreme loads.

After depressing treadle 77 to start the punch operation, the operator releases or takes his foot off the treadle when it is desired to stop the press. Release of the treadle raises wedge 73 to permit spring and stud assembly 72 to apply the brake band 69 to both brake drums 36 and 38. Since drum 38 has small mass, it will cease rotation almost instantly upon application of the brake, to thereby instantaneously immobilize cam 46.

Due to its heavier mass and greater inertia, the assembly comprising shaft 12 together with flywheel 21, brake drum 36 and the associated punch parts tends to keep rotating in spite of the application of brake band 69 to drum 36, whereby cam 49 is rotated relatively to cam 46 and regains the position illustrated in Figure 5 wherein the cam jaws are closed and sleeve 51 has shifted leftward toward the position illustrated in Figure 3.

As sleeve 51 moves leftward (Figure 3), the balls 61 retain their strut action, clutch member 58 remaining in torque transmitting engagement with lining 33 and the cam faces at 46 and 47 remaining in tight engagement, as in Figure 5. Sleeve 51 slides leftward through clutch member 58 against the opposition of spring plate 63 which is thereby compressed.

This condition ceases however when spring plate 63 has been compressed solid and flattened against spacer 64, thus ending the relative axial displacement of sleeve 51. When sleeve 51 so reaches the end of its axial movement, it delivers a light blow to clutch member 58 which jars clutch member 58 out of contact with lining 33 so that the clutch is quickly and positively disengaged. The clutch now being disengaged, and the cam jaws being closed as in Figure 5, so that the brake drum 38 is locked with shaft 12, brake 69 speedily arrests rotation of shaft 12. Spring 63, after clutch disengagement, expands to move clutch member 58 axially along sleeve 51 to restore it to the position of Figure 3 where the parts are again maintained in tight assembly.

Since the relative rotation of cam jaws 46 and 49 has again tensioned spring 53, and spring 63 has forced clutch member 58 to the position of Figure 3, the parts are thus stopped ready to repeat the above operation, with the assembly of clutch member 58, balls 61 and sleeve 51 ready to move toward the flywheel without separation of parts 58 and 61 when the treadle is again depressed and cam 46 stopped. Suitable controls (not disclosed) are provided to stop the shaft of the press at the top of the stroke after each application of the brake, but these will not be described here since such is not necessary to an understanding of the present invention.

When lining 33 wears, it may be taken out, shims placed on face 32 and the lining pressed back into bore 29 ready for continued use. Wear on cam surfaces 47 and 48 and other axial play in the clutch parts is taken up automatically in the above operation.

In the embodiments illustrated in Figures 10 and 11, the parts are essentially the same as in Figures 1–9, but an adjustment has been provided behind the spring plate which biases the clutch member 58 toward sleeve 51. As illustrated in Figure 10, the spring plate 77, which is in this case a dished annulus of spring sheet metal, is mounted between the rear flat side of clutch member 58 and a gear 78 which is internally threaded and rotatably mounted upon a threaded extension 79 of sleeve 51. Gear 78 is constantly meshed with a small gear 81 fixed upon a short shaft 82 journalled in clutch member 58 for rotation about an axis parallel to shaft 12 and provided with an external squared operating head 83 which is accessible for operation by a wrench near the inner side of the flywheel. A leaf spring 84 mounted on clutch part 58 bears against a flat side of head 83 to retain a given position of adjustment. When head 83 is rotated, as by a suitable wrench, rotation of gear 81 will correspondingly rotate gear 78 which by reason of its threaded mount at 79 will become displaced axially on sleeve 51 and thereby change the clearance, indicated at A in Figure 10, between gear 78 and the back face of clutch member 58. The width of the gear teeth of the respective gears 78 and 81 is sufficient to cover the range of desired adjustment.

By thus regulating the clearance between gear 78 and clutch member 58, I may vary the permissible relative axial displacement of sleeve 51 and clutch member 58 when the clutch is under load. In practice the heavy load on clutch member 58 due to strut action tends to bow it axially to reduce its clearance with respect to gear 78. When this clearance is eliminated, the thrust due to strut action which previously was transmitted through the friction clutch surfaces is now partially transmitted through gear 78 to sleeve 51. Any further increase in thrust due to strut action is entirely transmitted back to sleeve 51 so that the mechanism is no longer self-energizing and will slip when increased torque transmission is demanded. In other words, as soon as this clearance is taken up, the self-energizing action is "short circuited." By varying this clearance, using the adjustment above described, I may vary the torque at which this "short circuit" takes place, and consequently the load at which the clutch will slip.

This adjustment feature has been found to be particularly valuable in large presses. It replaces the hitherto considered essential axial adjustment of the flywheel for this purpose, and it is more efficient and involves less mechanical difficulty than adjustment of the ponderous flywheel.

Figure 12 illustrates merely that the balls 61 may be replaced by a series of sets of equally and oppositely disposed solid struts 85 having spherical ball ends in the respective sockets which are deeper when struts are employed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Clutch mechanism comprising a rotatable shaft, a brake drum fixed to said shaft, a brake drum rotatable freely about said shaft, means for applying a brake simultaneously to said drums, a sleeve slidably but non-rotatably mounted on said shaft, coacting inclined axially facing cam surfaces on adjacent ends of said rotatable brake drum and sleeve, a spring interconnecting said sleeve and rotatable brake drum normally urging such relative rotation of said sleeve and rotatable brake drum as to tend to axially displace said sleeve along the shaft relative to said rotatable drum due to the action of said cam surfaces, said sleeve and rotatable brake drum being held against such relative rotation by said brake, a thrust member rotatable and axially slidable on said sleeve, torque transmitting struts seated in opposed sockets on the sleeve and thrust member, a spring urging said thrust member into contact with said struts and sleeve but permitting limited separation of said sleeve and thrust member, a drive member rotatably mounted on said shaft, and coacting clutch surfaces on said drive member and thrust member.

2. Clutch mechanism comprising a shaft, a drive member rotatable on said shaft, a driven member axially slidable on said shaft, a first brake drum rigid with said shaft, a second brake drum rotatable about said shaft, said driven member comprising a sleeve slidably but non-rotatably mounted on said shaft, a clutch element axially slidable on said sleeve, torque transmitting struts between said sleeve and the clutch element having a self-energizing action operable during torque transmission to increase clutch engagement pressure, and resilient means reacting between the sleeve and clutch element for urging the sleeve and clutch element into contact with said struts, simultaneously operable brake means for said brake drums, means operable when the brake means is released for forcing said driven member into engagement with said drive member, and means operable when the brake means is applied for effecting clutch disengagement by moving said sleeve in the clutch disengagement direction.

3. In a clutch, a driving clutch member, a driven clutch member adapted to be shifted into engagement with said clutch driving member and comprising two parts interconnected by torque transmitting struts adapted to produce a self-energizing action in response to increased torque transmission, means for shifting said driven clutch member into clutch engagement, means maintaining said parts against relative movement during said shifting, and means operable while the clutch is engaged restraining said parts against relative axial displacement upon a reversal of the drive torque transmitting relation between said clutch members and for allowing only such relative movement between said parts as is due to said self-energizing action.

4. In a clutch, a driving clutch member, a driven clutch member adapted to be shifted into engagement with said clutch driving member and comprising two parts interconnected by torque transmitting struts adapted to produce a self-energizing action during torque transmission, means for shifting said driven clutch member into clutch engagement, means maintaining said parts against relative movement during said shifting, means operable while the clutch is engaged for allowing only such relative movement between said parts as is due to said self-energizing action, and means for limiting said self-energizing action to permit slippage between said clutch members upon predetermined overload.

5. In a clutch, driving and driven rotatable clutch members, a brake for said driven member, means operable when said brake is released for forcing said driven clutch member into engagement with said driving member, mechanism operable when the brake is applied for effecting clutch disengaging movement of said driven clutch member, said driven clutch member comprising parts interconnected by rigid interposed struts for the transmission of torque therebetween in either direction and providing a self-energizing action increasing clutch engagement pressure in response to increased torque transmission, and means operable while the clutch is engaged for allowing only such relative movement between said parts as is due to said self-energizing action.

6. In a clutch, a first rotatable clutch part, a second rotatable clutch part axially movable to engage and disengage said first clutch part, a member rotatable relative to said second clutch part, simultaneously applicable brake means for said member and said second clutch part, cooperating means between said member and said second clutch part operable when said brake means is released to axially move said second clutch part into torque transmitting engagement with said first clutch part, said second clutch part comprising relatively movable members connected by solid torque transmitting struts and maintained against axial separation during said axial movement and providing a self-energizing action increasing clutch engagement pressure in response to increased torque transmission, means operable while the clutch is engaged to permit only such relative movement between said parts as is due to said self-energizing action, and means operable when said brake means is applied for disengaging said first and second clutch parts.

7. In a clutch, a rotatable shaft, a driving clutch member rotatably mounted on said shaft, a driven clutch member comprising a sleeve non-rotatably mounted on said shaft and slidable therealong, a clutch element axially slidable on said sleeve, a plurality of torque transmitting struts interconnecting said sleeve and said clutch element and adapted to produce a self-energizing action in response to increased torque transmission, resilient means reacting between said sleeve and clutch element to urge said sleeve, clutch element, and torque transmitting struts together, cam means operable against said sleeve for shifting said driven clutch member into engagement with said driving clutch member, and means operable while the clutch is engaged for allowing only such relative movement between said sleeve and said clutch element as results from said self-energizing action.

8. In a punch press or the like, a rotatable fly wheel carrying a clutch surface, a clutch member carrying a cooperating clutch surface, said clutch member being slidable axially toward and from the fly wheel to effect clutch engagement or disengagement, a rotatable brake member, a brake, means for rotating said brake member when the brake is released, means responsive to rotation of said brake member for forcing said driven clutch member into clutch engagement with the fly wheel, means for applying said brake for arresting rotation of said brake member and moving said driven clutch member out of engagement with said fly wheel, said driven clutch member comprising two parts interconnected by torque transmitting struts adapted to produce a self-energizing action during torque transmission, and means operable while the clutch is engaged for allowing only such relative movement between said parts as is a necessary concomitant of said self-energizing action.

9. In a clutch mechanism, a rotatable shaft, a rotatable clutch driving member, a driven clutch member interposed between said driving member and said shaft comprising a first part frictionally engageable with said driving member and a second part slidable axially of said first part and axially slidable on said shaft, torque transmitting struts interconnecting said parts and adapted to produce a self-energizing action in response to increased torque transmission, a flexible connection urging said parts and struts into tight assembly, means for shifting said driven clutch member into engagement with said driving clutch member, means operable while the clutch is engaged for allowing only such relative movement between said parts as is a necessary concomitant of said self-energizing action, and means for disengaging said clutch members comprising means for shifting said second part along said shaft axially of said first part as permitted by said flexible connection and means for moving said first and second parts together after predetermined movement of said second part to effect disengagement of said first part from said driving member.

10. In a clutch, a rotatable shaft, a driving clutch member rotatably mounted on said shaft, a driven clutch member slidably and non-rotatably mounted on said shaft and comprising a first part slidable along said shaft and a relatively axially shiftable clutch part connected to said first part by torque transmitting mechanism adapted to produce a self-energizing action in response to increased torque transmission, resilient means on said driven clutch member urging said parts and mechanism together in tight assembly, means for moving said driven clutch member in a clutch engaging direction, and means for allowing only such relative movement between said parts while the clutch is engaged as is a necessary concomitant of said self-energizing action.

11. In a clutch, the combination of cooperating driving and driven clutch components rotatable about a common axis, means for controlling one of said clutch components for effecting engagement and disengagement of the clutch, said controllable clutch component including a torque responsive mechanism adapted to produce a self-energizing action for increasing engagement pressure between said clutch components in response to increased torque transmission therebetween comprising a pair of members interconnected by rigid struts for the transmission of torque therebetween in either direction, and mechanism rendered effective upon engagement and ineffective upon disengagement of said clutch for allowing only such relative movement of said members as is a necessary concomitant of said self-energizing action.

12. In a clutch, in combination, cooperating driving and driven clutch components mounted for rotation about a common axis, means for controlling one of said clutch components for effecting engagement and disengagement of the clutch, said controllable clutch component including a torque responsive mechanism adapted to produce a self-energizing action to increase clutch engagement pressure in response to increased torque transmission comprising a pair of members mounted for rotation about said axis in adjacent axially spaced relationship, a plurality of rigid struts mounted between and in abutment with said members in circumferentially spaced relation about said axis for transmission of torque therebetween in either direction, means operable while the clutch is engaged to allow only such relative movement between said members as is a necessary concomitant of said self-energizing action, and means for rendering said last named means ineffective and operable to effect disengagement of said clutch components.

13. In a friction clutch, cooperating driving and driven clutch components rotatably mounted about a common axis, one of said clutch components being controllable to effect engagement and disengagement of the clutch, said controllable clutch component comprising a pair of members mounted for rotation about said axis in adjacent spaced relationship, a plurality of rigid struts mounted between and in abutment with said members in circumferentially spaced relation about said axis for torque transmission in either direction between said members and adapted to produce a self-energizing action in response to increased torque transmission, resilient means urging said members together for conjoint movement, a cam for applying an axial force to said controllable clutch component in the clutch engaging direction for axially shifting said controllable clutch component into engagement with the other of said clutch components, means including said cam operable while the clutch is engaged for allowing only such relative movement between said members as is a necessary concomitant of said self-energizing action, and cam movement control mechanism adapted to actuate and release said cam to effect engagement and disengagement of said clutch components.

14. In a clutch, cooperating driving and driven clutch components rotatable about a common axis, means for controlling one of said clutch components for effecting engagement and disengagement of the clutch, said controllable clutch component comprising a pair of members mounted for rotation about the axis of said clutch in adjacently spaced relationship, a plurality of rigid struts mounted between and in abutment with said members in circumferentially spaced relation about said axis for transmission of torque therebetween in either direction and adapted to produce self-energizing action in response to increased torque transmission, means operable while the clutch is engaged to allow only such relative movement between said members as is a necessary concomitant of said self-energizing action, and means operable in response to an overload for limiting said self-energizing action to permit slippage between said clutch components.

15. In a friction clutch, cooperating driving and driven clutch components, one of said clutch components being operable for effecting engagement and release of the clutch, said controllable clutch component comprising a pair of members mounted for rotation about the axis of said clutch in adjacent axially spaced relationship, a plurality of rigid struts mounted between and in abutment with said members in circumferentially spaced relationship about said axis for transmission of torque therebetween in either direction and adapted to produce a self-energizing action in response to increased torque transmission, means for limiting relative axial separation of said members, resilient means urging said members together for conjoint movement and for permitting limited relative movement between said members, a cam mounted for movement relative to and adapted for forcing said controllable clutch component into engagement with the other of said clutch component and to allow only such relative movement of said members while the clutch is engaged as may be a necessary concomitant of said self-energizing action, and cam actuating and releasing means operable to release said cam to permit separation of said members in opposition to said resilient means whereby said separation limiting means becomes effective to disengage said controllable clutch component.

16. In a clutch, in combination, cooperating driving and driven clutch components mounted for rotation about a common axis, means for controlling one of said clutch components for effecting engagement and disengagement of the clutch, said controllable clutch component comprising a plurality of parts interconnected by torque transmitting struts and adapted to produce a self-energizing action in response to increased torque transmission, and means operable while the clutch is engaged restraining said parts against relative axial displacement upon a reversal of the drive torque transmitting relation between said clutch members and for allowing only such relative movement of said parts as is a necessary concomitant of said self-energizing action.

17. In a clutch, in combination, cooperating driving and driven clutch components mounted for rotation about a common axis, means for controlling one of said clutch components for effecting engagement and disengagement of the clutch, said controllable clutch component comprising a plurality of parts interconnected by torque transmitting struts and adapted to produce a self-energizing action in response to increased torque transmission, and means operable while the clutch is engaged for allowing only such relative movement of said parts as is a necessary concomitant of said self-energizing action, means for limiting said self-energizing action to permit slippage between said clutch components upon the occurrence of an overload.

18. In a clutch, the combination of cooperating driving and driven clutch components rotatable about a common axis, means for controlling one of said clutch components for effecting engagement and disengagement of the clutch, said controllable clutch component including a torque responsive mechanism adapted to produce a self-energizing action for increasing engagement pressure between said clutch components in response to increased torque transmission therebetween comprising a pair of members interconnected by rigid struts for torque transmission therebetween in either direction, means operable while the clutch is engaged for allowing only such relative movement between said members as is a necessary concomitant of said self-energizing action, and means responsive to predetermined relative movement of said members due to said self-energizing action for preventing further increase in engaging pressure between said clutch components.

JAMES L. GIFFEN.

References Cited in the file of this patent

UNITED STATES PATENTS

| Number | Name | Date |
|---|---|---|
| 2,020,809 | Stock | Nov. 12, 1935 |
| 2,170,893 | Gallup | Aug. 29, 1939 |
| 2,299,621 | Giffen | Oct. 20, 1942 |
| 2,308,680 | Eason | Jan. 19, 1943 |
| 2,449,893 | Gilman | Sept. 21, 1948 |

FOREIGN PATENTS

| Number | Country | Date |
|---|---|---|
| 823,402 | France | Jan. 20, 1938 |